United States Patent Office 3,376,740
Patented Apr. 9, 1968

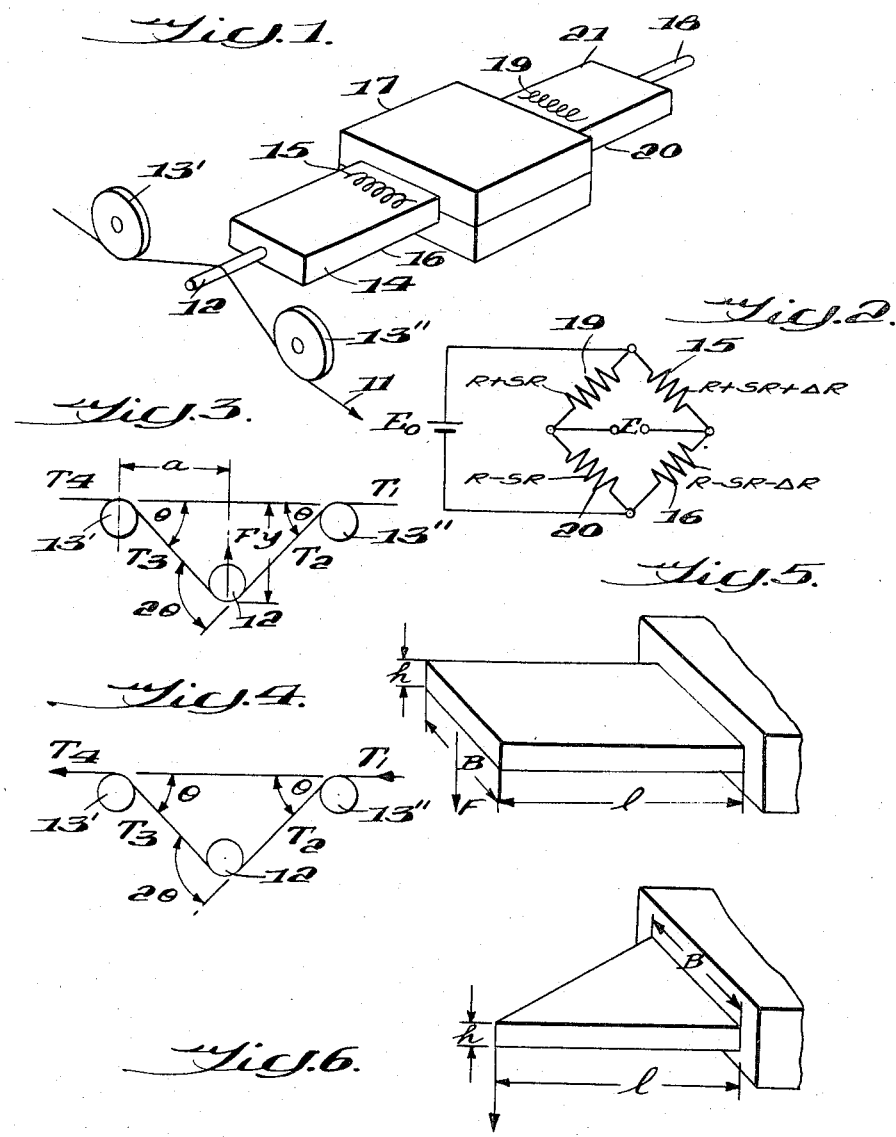

3,376,740
TENSION TRANSDUCER
John Vipond Harvey, Kingston, Ontario, Canada, assignor, by mesne assignments, to E. I. du Pont de Nemours and Company, Wilmington, Del., a corporation of Delaware
Filed Feb. 12, 1965, Ser. No. 432,197
Claims priority, application Canada, June 9, 1964, 904,762
2 Claims. (Cl. 73—144)

ABSTRACT OF THE DISCLOSURE

Method and apparatus for measuring threadline tensions by passing yarn over a sensing element having an electrical resistance strain gauge attached thereon to give a first electrical output signal proportional to the deflection plus any extraneous vibrations and the like, and combining this signal with a second signal proportional only to such extraneous signals from a second sensing arm having an eletcrical strain gauge attached thereto, whereby such extraneous signals are canceled.

---

This invention relates to a method for measuring tension and in particular to a yarn tension transducer for use in the textile industry.

Yarn tension transducers are used to measure threadline tensions at various points in the textile process. Such instruments utilize the tension in the threadline to displace a sensing arm, which in turn activates a tension indicating device either directly through mechanical linkages or indirectly using electrical, pneumatic, or hydraulic principles. In the case of electrical tension transducers, the threadline is passed through a guide system which brings the component of the threadline tension to bear on a sensing arm. The sensing arm moves or deforms elastically, giving rise to a change in inductance, capacitance, electromotive force, or resistance of a sensitive cell.

The yarn tension transducer of the present invention uses the principle of the bonded resistance strain gauge to convert deformations of the elastic sensing arm (cantilever), to linearly related changes in the electrical resistance of the gauges. These resistance changes are converted by standard electronic equipment, (not forming part of the transducer), into a visual indication of yarn tensions.

Several types of yarn tension transducers incorporating the principles of electrical resistance strain gauges (either bonded or unbonded types) are known in the art. These yarn tension transducers, however, are susceptible to extraneous vibration effects which are difficult to compensate for and which result in false readings.

It is therefore an object of the present invention to provide a yarn tension transducer having incorporated therein a very effective and unique method for eliminating from the output signal any unwanted effects of machine vibration and positional changes of the transducer.

Accordingly there is provided a method of measuring threadline tensions which comprises passing the yarn over a sensing element having an attached electrical resistance strain gauge, combining the electrical output signal from said strain gauge with the output signal from a second substantially similar sensing element and a second electrical resistance strain gauge, such that the unwanted extraneous signals are cancelled and the resultant signal is proportional to the tension in said yarn.

There is also provided a yarn tension transducer comprising, a sensing arm adapted to deflect due to the tension of yarn passing thereon, an electrical resistance strain gauge attached to said sensing arm so as to give a first electrical output signal proportional to the deflection of said sensing arm, a second sensing arm and attached thereto a second electrical resistance strain gauge to give a second electrical output signal adapted to substantially cancel out any unwanted extraneous signals from said first electrical output signal.

The method of this invention incorporates a dual cantilever system. Unlike the conventional counter balancing system used in a number of yarn tension transducers, the dual cantilever provides an effective cancellation of linear machine vibrations, and also the effects of transducer position changes, without lowering, in any way, the speed of response of the tension transducer. With properly designed transducers using this principle, yarn tension levels in the order of fractions of a gram varying in level at rates of 100 times per second and higher can be accurately measured with the aid of high speed recorders, (e.g. oscillographic recording systems). The transducer can be hand held or mounted directly on a textile machine without regard to linear vibration effects or changes in orientation of the transducer.

Other objects of the present invention will appear from the more detailed description set forth below; it being understood that such more detailed description is given by way of illustration, since various changes therein may be made by those skilled in the art without departing from the scope or spirit of the present invention.

In connection with that more detailed description:
FIGURE 1 is an isometric diagram of the dual cantilever yarn tension transducer;
FIGURE 2 is a schematic diagram showing the electrical connections of the gauges;
FIGURE 3 is a diagram of the thread path over the sensing element and relates to deflection;
FIGURE 4 is a diagram of the thread path over the sensing element and relates to yarn tension;
FIGURE 5 is a diagram of a rectangular cantilever;
FIGURE 6 is a diagram of a wedge-shaped cantilever.
Referring now to the drawings:
FIGURE 1 is an isometric diagram of the tension transducer and illustrates the principle of the operation of the instrument.

The threadline 11 is fed under a yarn giude 13' over a sensing pin 12 and under a second yarn guide 13". The sensing pin 12 is mounted on an elastic sensing cantilever 14 which will deflect due to the tension in the threadline. Electrical resistance strain gauges 15 and 16 are bonded to the surface of the sensing cantilever 14 and convert any deformations of the sensing cantilever 14 to linear related changes in the electrical resistance of the gauges. These resistance changes can easily be converted into a visual indication of yarn tension by standard electronic equipment which is not shown.

The sensing cantilever 14 is mounted on a main support block 17. Also mounted on this support block on the side opposite the sensing cantilever is a compensating cantilever 21 substantially the same as the sensing cantilever 14. A dummy pin 18 is mounted on this compensating cantilever and serves to match the compensating cantilever 21 to the sensing cantilever 14. Electrical resistance strain gauges 19 and 20 are bonded to the surface of the compensating cantilever. Any deformations of the compensating cantilever and dummy pin are converted to changes in the electrical resistance of these strain gauges 19 and 20.

The compensating cantilever is subjected to all of the same vibrational movements and outside influences that the sensing cantilever is subjected to, except for just one force; this being the deflection of the sensing cantilever caused by the tension of the yarn. The signals from the four strain gauges can easily be combined in a manner such that the signals caused by extraneous vibrational effects are cancelled out leaving only the signal which is indicative and proportional to the tension on the yarn. The manner in which these signals can be combined will be understood from a study of FIGURE 2.

Although the description given above describes a tension transducer having the two cantilevers extending from opposite sides of the support block 17, it is evident that the compensating cantilever 21 is located in this position only for convenience. If necessary it could equally as well be mounted parallel to and on the same side of the support block 17 as the sensing cantilever 14.

Electrically these transducers are of the four arm resistance Wheatstone bridge design, with output sensitivity compatible with standard carrier amplifier-recorders. Referring to FIGURE 2:

$R$=nominal unstrained resistance of each gauge;
$SR$=change in resistance of each gauge due to linear vibrations imposed on the transducer causing cantilever vibration, plus the additional effect of gravity causing the cantilever to deflect slightly;
$\Delta R$=change in resistance experienced by the two active gauges 15 and 16 on the sensing cantilever due to yarn tension on the sensing pin 12.

The following calculations give the magnitude of the output signal, and demonstrate clearly how the unwanted effects of SR are not present in the output signal;

$$E = Eo \left( \frac{R-SR}{2R} - \frac{R-SR-\Delta R}{2R} \right)$$

$$E = \frac{Eo}{2} \left( \frac{\Delta R}{R} \right)$$

In the design and construction of the sensing cantilever the most important points which should be considered in the choice of materials and dimensional details of the cantilever are as follows:

(a) strain limits
(b) amount of cantilever deflection
(c) natural resonant frequency of the cantilever
(d) dimensions with respect to the application of strain gauges

Strain limits

The maximum strain limits at full scale rated tensions preferably are limited to $2,000 \times 10^{-6}$ in./in. to insure long life of the strain gauges, particularly with reference to fatigue. Cantilever materials having elastic limits above $2,000 \times 10^{-6}$ in./in. and low mechanical hysteresis are normally used. It follows that cantilever dimensions which produce a maximum strain level of $2,000 \times 10^{-6}$ in./in. at full-scale rated loads are usually chosen.

Cantilever deflection

The amount of cantilever deflection is limited to a value of which will not introduce non-linearity is electrical output signals greater than a preselected value, (for example 2% full-scale rated load deviation from linearity). The origin of transducer non-linearity due to cantilever deflection is explained in detail below. Cantilever deflection is a function of applied tension, cantilever material and cantilever dimension.

Natural resonant frequency

To insure an accurate reproduction of the tension variations in the moving threadline, the natural resonant frequency of the cantilever plus attached pin or pulley is established at a value which is at least four times the frequency of yarn vibrations to be observed. In some models this value may be 700 cycles per second. Cantilever natural resonant frequency is determined by cantilever material and cantilever dimensions as is more fully explained below.

Cantilever dimensions

Finally the cantilever dimensions are chosen so that standard metalfilm strain gauges can be conveniently applied without adversely effecting the overall elastic properties of the system.

With respect to the conditions discussed above, several cantilever materials are satisfactory, including aluminum alloys, steels and magnesium allows.

It is possible to use either pins or pulleys or combinations of both as guide surfaces on the transducer. No single combination is deal for all applications. The relative merits and drawbacks of pulleys and pins are listed below:

Pins (a) No vibrational problems;
(b) Yarn speed is not limited by pins;
(c) Pins introduce friction into the system, thereby giving rise to a significant tension drop across the transducer, which can upset or break the threadline;
(d) Pins have low mass compared to pulleys which is an advantage in keeping the resonant frequency of the cantilever sensing system high.

Pulleys (a) Pulleys have a certain amount of bearing vibration or chatter which is especially annoying when the pulley is attached to the sensing cantilever;
(b) Pulleys have a definite limiting speed;
(c) Properly chosen pulleys introduce very little tension drop across the transducer;
(d) Pulleys, because of their higher mass, decrease resonant frequency of the cantilever sensing system.

Theoretical treatment relating cantilever deflection to transducer non-linearity Referring to FIGURE 3, the yarn guides 13' and 13" and pin 12 have a coefficient of friction $\mu$ with the yarn. Referring to standard texts, the increase in tension in the yarn over the guide 13" is given by $$T_2 = T_1 e^{\mu\theta}$$

where $e$ is the base of natural logarithms, $\theta$ is the angle wrap around the pin in radians and $T_1, T_2, T_3$, and $T_4$ are yarn tensions in grams. Consequently, the force F exerted on the sensing pin B is given by $$F = T_2 \sin \theta + T_3 \sin \theta$$
$$= T_1 e^{\mu\theta} \sin \theta + T_1 e^{3\mu\theta} \sin \theta$$
$$= T_1 \sin \theta (e^{\mu\theta} + e^{\mu\theta})$$
$$= 2T_1 e^{2\mu\theta} \sin \theta \cos h^{\mu\theta}$$

for $\mu\theta$ 0.14, $\cos h\ \mu\theta \cong 1.00$ (within 1%)
Therefore $$F \cong 2T_1 e^{2\mu\theta} \sin \theta$$

If the pin 12 deflects under the applied force F, then the value of $\theta$ will change. Consequently, F will not be simple linear function of $T_1$, since $\theta$ is a function of $T_1$ also. The small change in F caused by a small change in $\theta$ is given by $$dF = 2T_1(\sin \theta e^{2\mu\theta}(2\mu)d\theta + \cos \theta e^{2\mu\theta}d\theta)$$

Therefore, the percent change in F is given by $$\frac{100 dF}{F} = \frac{2T_1(\sin \theta \cdot^{2\mu\theta}(2\mu)d\theta + \cos \theta \cdot e^{2\mu\theta}d\theta) \times 100}{2T_1 \sin \theta \cdot e^{2\mu\theta}}$$

$$= (2\mu + \cot \theta) d\theta \times 100$$

Since $$\theta = \arctan \frac{y}{a},$$

$$d\theta = \left[1 + \left(\frac{y}{a}\right)^2\right] - 1 \frac{dy}{a}$$

$$= \frac{1}{\frac{a}{y}\left(1 + \frac{y^2}{a^2}\right)} \frac{dy}{y}$$

Therefore $$d\theta = \frac{1}{\left(\frac{a}{y} + \frac{y}{a}\right)} \frac{dy}{y}$$

As a result, $$\frac{100dF}{F} = 100(2\mu + \cot\theta)\left[\frac{1}{\frac{a}{y}+\frac{y}{a}}\right]\frac{dy}{y}$$

$$\frac{100dF}{F} = \left(\frac{2\mu + \cot\theta}{\frac{a}{y}+\frac{y}{a}}\right)\left[100\frac{dy}{y}\right]$$

The above equation relates a percent change in F applied to the cantilever to a percent change in the deflection Y of the cantilever when three pins are used as guide surfaces.

$$\frac{100dF}{F} = \left(\frac{\mu + \cot\theta}{\frac{a}{y}+\frac{y}{a}}\right)\left[100\frac{dy}{y}\right]$$

In the case of 3 pulleys $$\frac{100dF}{F} = \frac{\cot\theta}{\left(\frac{a}{y}+\frac{y}{a}\right)}\left[100\frac{dy}{y}\right]$$

Usually this value $$\frac{100dF}{F}$$

which is the percent loss in linearity at an applied tension corresponding to a deflection of the cantilever $dy$, is kept down to a nominal value at full scale applied tension (typically 2%).

*Theoretical treatment relation percent increase in yarn tension across transducer to various yarn guiding systems*

Referring to FIGURE 4, the percentage increase in yarn tension across the transducer is defined as:

$$\text{percent increase in tension} = \left[\frac{T_4 - T_1}{T_1}\right] \times 100$$

In the case of frictionless pulleys with no yarn movement, $T_1 = T_2 = T_3 = T_4$, and therefore percent increase in $$\text{tension} = \left[\frac{T_1 - T_1}{T_1}\right] \times 100 = 0\%$$

When the guides 13', 12 and 13" are pulleys having some friction such that the tension drop across each pulley is K grams, then $$T_4 = T_1 + 3K \text{ grams}$$

and percent increase in tension $= \left[\frac{T_4 - T_1}{T_1}\right] \times 100\%$ $$= \left(\frac{300k}{T_1}\right)\%$$

When guides 13', 12 and 13" are pins having a coefficient of friction $\mu$ with yarn, then $$T_2 = T_1{}^{\mu\theta}$$
$$T_3 = T_2 e^{2\mu\theta}$$
$$T_4 = T_3 e^{\mu\theta}$$
$$T_4 = T_1 e^{4\mu\theta}$$

Therefore and percent increase in tension $= \left(\frac{T_4 - T_1}{T_1}\right) \times 100$ and percent increase in tension $= \left(\frac{T_1 e^{4\mu\theta} - T_1}{T_1}\right) \times 100$ $$= 100(e^{4\mu\theta} - 1)\%$$

*Equations used to calculate strain limits, amount of cantilever deflection, and cantilever resonant frequency*

The following equations are simple variations of mechanical design equations found in the Mechanical Engineering Handbook by Marks: Referring to FIGURES 5 and 6, the list of symbols is as follows:

$l$ = length of cantilever (inches)
$h$ = thickness of cantilever (inches)
$B$ = width of cantilever (inches)
$F$ = force applied at end of cantilever (pounds)
$E$ = modulus of elasticity of cantilever materials (lb./sq. in.)
$\alpha$ = specific gravity of cantilever material (unitless)
$f$ = natural resonant frequency of cantilever (c.p.s.)
$dy$ = cantilever deflection of point of applied force (inches)
$\epsilon$ = maximum strain in cantilever (inches per inch)

Approximate strain equations at point of maximum strain $$\text{Rectangular cantilever: } \epsilon = \frac{6Fl}{EBh^2}$$

$$\text{Wedge-shaped cantilever: } \epsilon = \frac{6Fl}{EBh^2}$$

Approximate deflection equations $$\text{Rectangular cantilever: } dy = \frac{4Fl^3}{EBh^3}$$

$$\text{Wedge-shaped cantilever: } dy = \frac{6Fl^3}{EBh^3}$$

Approximate resonant frequency equations $$\text{Rectangular cantilever: } f = 13.4\sqrt{\frac{Eh^2}{\alpha l^4}}$$

Wedge-shaped cantilever: (higher than above)

EXAMPLE 1

A model of a tension transducer constructed according to the present invention was tested and gave very satisfactory results. This transducer has a 0.078" diameter AlSiMag 614 (24 RMS roughness) pin attached to the sensing cantilever, whose low mass provides a high resonant frequency cantilever system (700 cycles per second). The pin has a coefficient of friction $\mu$ of approximately 0.2, and the wrap angle around the pin is approximately 50°. This gives rise to an approximate tension increase of 20% across the transducer, which is satisfactory for most applications below 1,000 yards per minute yarn speed, with the exception of draw zones. Because of its high resonant frequency, it is ideally suited for monitoring tensions which are fluctuating rapidly, (up to 200 fluctuations per second). The remaining two pulleys introduce very little additional tension drop across the transducer and bearing chatter is not a major problem since they are not attached to the sensing cantilever.

EXAMPLE 2

A second model having three pulleys of custom design was also tested. The bearings in each pulley are ultra high speed preloaded duplex pairs with special light oil for low friction drag. These bearings are designed to operate satisfactorily at yarn speeds up to 3,000 yards per minute with minimum chatter. This pulley arrangement is satisfactory for the measurement of tensions in applications where the tension drop across the transducer must be kept to a minimum (e.g. draw zone). The presence of the pulley on the sensing cantilever lowers the natural resonant frequency, and therefore limits the transducer to a somewhat lower frequency range.

What is claimed is:

1. A yarn tension transducer for measuring threadline tension in running lengths of yarn comprising: A first flexible arm adapted to deflect due to the tension of yarn passing thereon; an electrical resistance strain gauge attached to said flexible arm to give a first electrical output signal proportional to the deflection of said arm and to extraneous vibrations, a second flexible arm connected to said first flexible arm so that extraneous vibrations are substantially identical in each arm; a second electrical resistance strain gauge attached to said second flexible arm to give a second electrical output signal varied only by said extraneous vibrations; and means for combining said output signals to substantially cancel out said extraneous virbation signals and give a resultant signal proportional only to the deflection of said first flexible arm.

2. A yarn tension transducer for producing an electrical output signal proportional only to yarn tension in running lengths of yarn comprising: A first flexible arm adapted to deflect due to the tension of yarn passing thereon; a first pair of electrical resistance strain gauges mounted on opposing surfaces of said flexible arm so that each gauge gives an electrical output signal proportional to the deflection of said arm and to extraneous vibrations; a second flexible arm connected to said first flexible arm so that extraneous vibrations are substantially identical in each arm; and a second pair of electrical resistance strain gauges mounted on opposing surfaces of said second flexible arm so that each of said second pair of gauges gives an electrical output signal varied only by said extraneous vibrations, the resistances of the four strain gauges being connected in a Wheatsone bridge circuit such that one leg of said circuit consists of the resistances of the first pair of strain gauges connected in series and the other leg of said circuit consists of the second pair of said strain gauges connected in series whereby the output signal taken across the normal null points of said circuit is substantially free from any extraneous signals.

References Cited
UNITED STATES PATENTS

| | | | |
|---|---|---|---|
| 2,767,974 | 10/1956 | Ballard et al. | 73—88.5 XR |
| 2,885,891 | 5/1959 | Wilson et al. | 73—88.5 XR |
| 3,164,995 | 1/1965 | Federn et al. | |

FOREIGN PATENTS

| | | |
|---|---|---|
| 118,335 | 1958 | U.S.S.R. |
| 124,188 | 1958 | U.S.S.R. |
| 153,797 | 1963 | U.S.S.R. |
| 155,019 | 1963 | U.S.S.R. |

RICHARD C. QUEISSER, *Primary Examiner.*

JAMES GILL, *Examiner.*

C. A. RUEHL, *Assistant Examiner.*